United States Patent [19]

Gerberding

[11] 4,335,221
[45] Jun. 15, 1982

[54] PREPARATION OF MIXTURES OF LINEAR THREE-BLOCK COPOLYMERS, AND MOLDINGS PRODUCED THEREFROM

[75] Inventor: Karl Gerberding, Wachenheim, Fed. Rep. of Germany

[73] Assignee: BASF Aktiengesellschaft, Fed. Rep. of Germany

[21] Appl. No.: 185,531

[22] Filed: Sep. 9, 1980

[30] Foreign Application Priority Data

Oct. 9, 1979 [DE] Fed. Rep. of Germany ....... 2940861

[51] Int. Cl.$^3$ .......................................... C08F 257/02
[52] U.S. Cl. ...................................... 525/89; 525/193; 525/237; 525/250; 525/271; 525/314; 525/316
[58] Field of Search ............... 525/314, 316, 193, 237, 525/250, 271, 89

[56] References Cited

U.S. PATENT DOCUMENTS 3,507,934  4/1970  Minor et al. .
3,985,830  10/1976 Fetters et al. .
4,080,407  3/1978  Fodor ................................. 525/314
4,104,326  8/1978  Fodor .
4,167,545  9/1979  Fahrback et al. .
4,168,286  9/1979  Moczygemba ..................... 525/314

FOREIGN PATENT DOCUMENTS 884974 12/1961 United Kingdom .
1519928 8/1978 United Kingdom .

Primary Examiner—William F. Hamrock
Attorney, Agent, or Firm—Keil & Witherspoon

[57] ABSTRACT

A process for the preparation of a mixture of linear three-block copolymers which contain from 70 to 80% by weight of styrene units and from 20 to 30% by weight of elastomeric polymer segments based on a conjugated diene, in a total of three stages, specific conditions in respect of the initiator and of the monomers to be polymerized being essential in the individual stages in order to ensure the polymodal structure of the three-block copolymers. After complete reaction of the monomers, the mixture of the living polymers is treated with proton-active compounds, and the mixture of the block copolymers is isolated by removing the solvent. The compositions obtained by the novel process are transparent and clear and have good mechanical properties. They are furthermore readily processable by the methods conventionally used for thermoplastics. The compositions are particularly suitable for the production of moldings and of packaging materials.

4 Claims, No Drawings

PREPARATION OF MIXTURES OF LINEAR THREE-BLOCK COPOLYMERS, AND MOLDINGS PRODUCED THEREFROM

The present invention relates to a process for the preparation of mixtures of linear three-block copolymers which are built up from a major proportion of a monovinyl-aromatic compound and a minor proportion of a conjugated diene and which possess high transparency and clarity, good mechanical properties, especially a high impact strength, and good processability.

The prior art includes:
(1) British Pat. No. 884,974
(2) German Laid-Open Application DOS No. 1,645,406 (U.S. Pat. No. 3,507,934)
(3) German Laid-Open Application DOS No. 1,959,922 (U.S. Pat. No. 3,639,517
(4) German Laid-Open Application DOS No. 2,550,227
(5) German Laid-Open Application DOS No. 2,541,511
(6) German Laid-Open Application No. 2,529,065.

The preparation of linear two-block and multiblock copolymers from styrene and butadiene as the diene component is disclosed completely generally in (1). Subsequently, elastomeric molding materials have been proposed (c.f. (2)) which are based on A-B-A linear three-block copolymers and can be prepared by alternating addition of the monomer A (styrene) and repeated addition of initiator. In the known process, a polymodal distribution of the A-blocks is achieved. In this process, the linear three-block copolymer is produced by coupling, for example of A-B$_\frac{1}{2}$-Li by means of dichloroethane to give mixtures of linear three-block copolymers.

For producing thermoplastic molding compositions, (3) proposes starting from a linear, living two-block copolymer A-B-Li and producing block copolymers with star-shaped branching from this by means of a coupling reaction. In preparing the linear starting materials, the monovinyl-aromatic monomer (styrene) is added in several portions; the initiator is also added in portions, so that the resulting end products, having star-shaped branching, exhibit a polymodal distribution.

Finally, it is known, from (4), to prepare block copolymers which have star-shaped branching and a polymodal distribution, and in which the individual branches of the stars consist of linear three-block copolymers. These block copolymers with star-shaped branching, like the products known from (3), possess good transparency and good processability, but their mechanical properties are better than those of the products known from (3).

(5) describes a process for the preparation of a non-branched block copolymer mixture which contains from 60 to 95% by weight of a vinyl-aromatic compound. This process is a multi-stage process in which, in a first stage, a polymer or copolymer, in particular a block copolymer, is prepared, whilst in a second stage, after renewed addition of initiator, further monomers, or mixtures of monomers, can be polymerized onto the living end of the polymer from the first stage. The statement of the object of the invention indicates that the applicant sought to prepare stable dispersions in the form of block copolymer mixtures in aliphatic hydrocarbons. This object can (cf. the comments on page 14, paragraph 2) only be achieved if the ratio of the contents of monovinyl-aromatic compounds in the first and second process stages is not less than 1:1.8. The Comparative Experiments show that if this condition is not met either a stable dispersion is not obtained or the polymer mixtures obtained are cloudy, with poor transparency, and with inadequate tensile strength and very inadequate impact strength.

Publications (3) and (4) taught a skilled worker that to produce molding compositions which contain high-styrene block copolymers and which possess good mechanical properties, high transparency, and, at the same time, good processability, it is necessary to couple linear block copolymers. This coupling reaction is a separate process step which often proceeds with incomplete conversion; furthermore, the coupling reaction as a rule [cf. (6)] does not give homogeneous products. In addition, the coupling agent used often introduces a central atom, whose presence has an adverse effect on the properties of the end product. In some cases there is the additional problem that the process for the preparation of the coupled product necessitates toxic substances, such as epoxidized soyabean oil or dichloroethane [cf. (2)].

On the other hand it is known from (5) that only in special cases can stable mixtures of linear, high-styrene block copolymers be obtained in hexane.

It is an object of the present invention to provide a simple and universally applicable process for the preparation of transparent, easily processable, high-impact mixtures of block copolymers, which does not suffer from the above disadvantages and which furthermore makes it possible to have a lower initiator content in the end product than is possible in the prior art. Surprisingly, a mixture of block copolymers produced by the novel process gives products possessing impact strength, transparency and processability previously only achievable with block copolymers having star-shaped branching. Using the novel process, it is possible to prepare products which, though having a low butadiene content, possess an impact strength which as a rule is only achieved with block copolymers having star-shaped branching. This would not have been expected by a skilled worker.

Accordingly, the present invention relates to a process for the preparation of a mixture of block copolymers which essentially contain from 70 to 80% by weight of a monovinyl-aromatic monomer(s) and from 20 to 30% by weight of a conjugated diene, the mixture essentially containing linear three-block copolymers

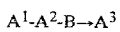

where $A^1$, $A^2$ and $A^3$ are non-elastomeric polymer segments of different molecular weight or different structure, and are based on a monovinyl-aromatic compound, and B is an elastomeric polymer segment based on a conjugated diene of 4 to 8 carbon atoms, and the transitions between the polymer segments B and $A^3$ are gradual and the other transitions are all sharp, by effecting the following process stages in an inert solvent:

(a) in a first process stage, polymerizing a relatively high proportion of the monovinyl-aromatic monomer(s) in the presence of at most half, based on the total amount to be used, of a monolithium-hydrocarbon as the initiator, (Ia), until the monomer(s)

has been substantially completely converted, thereafter (b) in a second process stage, adding the remaining amount of initiator, (Ib), which is at least equal to the amount used in process stage (a), adding a further proportion of the monovinyl-aromatic monomer(s) to the solution, and continuing the polymerization until the monomer(s) has been completely converted and finally (c) in a third process stage, adding to the reaction solution a mixture of the residual amount of the monovinyl-aromatic monomer(s) and the total amount of the conjugated diene monomer and polymerizing until the monomer(s) has been substantially completely converted, wherein, in the first process stage (a), from 40 to 80% by weight of the total amount of monovinyl-aromatic monomer(s) to be employed and an amount of initiator such that the molar ratio of the amounts of initiator used respectively in the first and second process stages, Ia/Ib, is from 1:2 to 1:7, are used, in the second process stage (b) from 15 to 30% by weight of the total amount of monovinyl-aromatic monomer(s) to be employed is added and in process stage (c) a mixture of from 10 to 30% by weight of the total amount of monovinyl-aromatic monomer(s) to be employed, and from 20 to 30% by weight of conjugated diene monomer, based on the total amount of all monomers to be employed, is added, and after complete conversion of the monomers the mixture of the living polymers is treated with proton-active compounds and the resulting mixture of block copolymers is isolated by removing the solvent.

Examples of monovinyl-aromatic monomers which may be used for synthesizing the novel non-branched, block copolymers are styrene, side chain-alkylated styrenes, eg. α-methylstyrene, and nuclear-substituted styrenes, eg. vinyl-toluene and ethylvinylbenzene. The monovinyl-aromatic monomers may be employed individually or as mixtures with one another. Preferably, however, styrene alone is used. Examples of conjugated dienes of 4 to 8 carbon atoms which may be used individually or as mixtures with one another for the preparation of the branched block copolymers are butadiene, isoprene and 2,3-dimethylbutadiene. Butadiene and isoprene are particularly advantageous to use, and butadiene is especially preferred.

The mixture of linear block copolymers obtained by the novel process should contain a total of from 70 to 80% by weight, especially from 72 to 78% by weight, of the monovinyl-aromatic monomer and from 30 to 20% by weight, preferably from 28 to 22% by weight, of the conjugated diene, as copolymerized units, the percentages in each case being based on the sum of all monomers employed.

In detail, the novel process is carried out by successive polymerization of the monomers in solution in the presence of a monolithium-hydrocarbon as the initiator, with stepwise addition of monomer and initiator and subsequent treatment of the resulting living linear block copolymers with a proton-active compound, as follows:

In a first process stage (a), the non-elastomeric polymer segment $A^1$ is prepared by anionic polymerization, namely by polymerizing a substantial portion of the total amount of the monovinyl-aromatic monomer with a relatively small amount of the monolithium-hydrocarbon initiator in an inert solvent under conventional conditions. This stage employs from 40 to 80% by weight, preferably from 45 to 70% by weight, of the total amount of monovinyl-aromatic monomer used for the preparation of the mixture of block copolymers.

The amount of initiator, Ia, employed in the first process stage depends particularly on the desired molecular weight of the copolymer and is in general from 0.5 to 1.1 millimoles per mole of the monovinyl-aromatic monomer employed in this first process stage. Preferably, the amount employed is from 0.62 to 1.0 millimole per mole.

The initiator employed is a conventional monolithium-hydrocarbon of the general formula RLi, where R is an aliphatic, cycloaliphatic, aromatic or mixed aliphatic-aromatic hydrocarbon radical of 1 to about 12 carbon atoms. Examples of lithium-hydrocarbon initiators employed in the invention are methyl-lithium, ethyl-lithium, n-butyl-lithium, sec.-butyl-lithium, tert.-butyl-lithium, isopropyl-lithium, cyclohexyl-lithium, phenyl-lithium and p-tolyl-lithium. Preferably, a monolithium-alkyl compound, where alkyl is of 2 to 6 carbon atoms, is employed, n-butyl-lithium and sec.-butyl-lithium being particularly preferred.

The polymerization of the monovinyl-aromatic compounds is carried out in solution in a conventional inert hydrocarbon solvent. Suitable solvents are aliphatic, cycloaliphatic or aromatic hydrocarbons which are liquid under the reaction conditions and are preferably of 4 to 12 carbon atoms. Specific examples include cyclohexane, isobutane, n-pentane, iso-octane, cyclopentane, cycloheptane, benzene, toluene, the xylenes and others. Mixtures of these solvents may also be employed.

It is also possible to carry out the polymerization in the presence of small amounts, in general of from $10^{-3}$ to 5% by weight, based on total solvent, of ethers, eg. tetrahydrofuran, dimethoxyethane, phenyl methyl ether and others, and in this way the rate of polymerization, the configuration of the butadiene polymer segments B and the random transition between segments B and $A^3$ can be influenced in a conventional manner. Preferably, however, the process is carried out without added ether.

The concentration of the monomers in the reaction solution is not critical and can be adjusted so as to allow any desired apparatus to be used for the polymerization. Usually, the polymerization is carried out in from 10 to 30% strength solutions in inert solvents.

The polymerization is carried out under the conventional conditions for anionic polymerization with lithium-organic compounds, for example under an inert gas atmosphere, with exclusion of air and moisture. The polymerization temperature may be from 10° to 180° C. and is preferably kept at from 50° to 120° C.

In the first process stage, the polymerization is taken to virtually complete conversion of the monovinyl-aromatic compounds employed. This gives a solution of non-elastomeric, living polymers of the monovinyl-aromtic compounds (ie. polymer segment $A^1$) possessing active terminal lithium-carbon bonds, which are capable of further addition of monomers.

In the second process stage (b), a further quantity of initiator, Ib, and a further 10–30% by weight, preferably 15–25% by weight, of the total amount of monovinyl-aromatic monomers used for the preparation of the unbranched block copolymers are added to the solution of the non-elastomeric living polymers obtained in stage (a). The ratio of the amounts of vinyl-aromatic compounds used in the first and second process stages respectively is from 8:1 to 2:1, especially from 6:1 to 3:1.

However, the sum of the amounts of monovinyl-aromatic monomers employed in the first and second process stages should be at most 90% by weight, but more than 70% by weight, of the total amount of monovinyl-aromatic compound used for the preparation of the mixture of block copolymers.

The amount of initiator, Ib, additionally introduced into the reaction solution in the second process stage should be greater than the amount of initiator, Ia, employed in the first stage of the polymerization. Preferably, the ratio of the amounts used in stages (a) and (b), namely Ia/Ib, is 1:2–8, especially 1:3–6.

Suitable initiators for the second stage are the monolithium-hydrocarbons which are also used in the first stage; preferably, the initiator is identical in both stages. It is advantageous to introduce the additional initiator, Ib, into the reaction solution before the additional proportion of monovinyl-aromatic monomer is introduced.

In the second process stage (b), the polymerization conditions maintained are as a rule the same as in the first process stage; in stage (b) the polymerization is once again taken to virtually complete conversion of the added monovinyl-aromatic monomers. In the course thereof, the monomers added in the second process stage are added on at the active, lithium-terminated chain ends of the polymer segments $A^1$-Li produced in the first stage, to form a $A^1$-$A^2$-Li, and also react with the additional fresh initiator to form new chains of living polymers $A^2$-Li.

The ratio in which these two types of non-elastomeric polymer segments based on the monovinyl-aromatic compounds are present in the reaction solution after complete polymerization of the monovinyl-aromatic compound at the end of the second process stage (b) accordingly corresponds to the ratio of initiator added in the first and second process stages. Both types of polymer segment ($A^1$-$A^2$) and $A^2$ have a reactive lithium-carbon bond at one chain end, where further monomer may add on.

Finally, in the third process stage (c), the polymer segments B are polymerized onto the active chain ends of the non-elastomeric polymer segments ($A^1$-$A^2$)-Li and $A^2$-Li, and following this the polymer segments $A^3$ are polymerized on, to form the polymer blocks ($A^1$-$A^2$-B→$A^3$) and ($A^2$-B→$A^3$). For this purpose, a mixture of the remaining monovinyl-aromatic monomer, corresponding to 10–30% by weight, and especially 15–25% by weight, of the total amount to be used, and the total amount of the conjugated diene, is added to the fully polymerized reaction solution from the second process stage (b). The amount of conjugated diene is 15–35% by weight, preferably 10–30% by weight, of the total of the two types of monomers employed for the preparation of the novel unbranched block copolymers. The monomer mixture is polymerized under the same polymerization conditions as employed for the first two stages, (a) and (b), once again to virtually complete conversion of the monomers.

Because of the different copolymerization parameters, the conjugated dienes polymerize substantially more rapidly than the monovinyl-aromatic compounds, so that after addition of the monomer mixture in the third process stage, it is at first predominantly the conjugated dienes which undergo polymerization, with only an occasional molecule of monovinyl-aromatic compound. Only toward the end of the diene polymerization, ie. when almost all the conjugated diene monomers have been polymerized, does the polymerization of the monovinyl-aromatic compounds commence at a significant rate, so that the greater part—as a rule more than 70% by weight and in most cases more than 80% by weight—of the monovinyl-aromatic monomers contained in the monomer mixture added in process stage (c) polymerizes only after the conjugated diene has been consumed.

Accordingly, in the third process stage an elastomeric polymer segment B based on the conjugated dienes is first polymerized onto the non-elastomeric polymer segments ($A^1$-$A^2$)-Li and $A^2$-Li, the elastomeric segment being a copolymer consisting in the main of the conjugated diene, with small amounts of the monovinyl-aromatic monomer, after which a non-elastomeric polymer segment $A^3$ is formed, which only contains units of the monovinyl-aromatic monomers. Since the proportion of the monovinyl-aromatic monomer progressively increases toward the living end of the polymer segment B and the proportion of the conjugated diene progressively decreases, the transition between the polymer segments B and $A^3$ which are formed is not sharp but takes place gradually; this is commonly referred to as a smudged transition between the segments. This fact is taken into account by the use of the symbol → in the general formula for the mixtures of block copolymers.

After the monomer mixture has been completely polymerized in the third process stage (c), the reaction solution contains a mixture of living, linear block copolymers of the types ($A^1$-$A^2$-B→$A^3$)-Li and ($A^2$-B→$A^3$)-Li, in each case possessing reactive lithium-carbon bonds at the free ends of the polymer segments $A^3$. This mixture of living block copolymers is inactivated by a treatment with proton-active substances under the conditions under which the polymerization is carried out. The proton-active substances are added to the stirred solution of process stage (c), in the amounts required to cause the red coloration of the solution, which is typical of the styryllithium bond, to disappear.

Suitable proton-active substances for the purposes of the present invention are all compounds which are capable of inactivating the living polymers, for example by donating $H^+$ or some other group. Examples include water and alcohols, eg. $CH_3OH$ and $CH_2H_5OH$. If reactive groups are to be introduced at the end of the polymer chain—which is not a preferred embodiment—$CO_2$, isocyanates, amines and the like may also be used. Of the above substances, it is especially water and alcohols which are employed in (calculable) sufficient amount.

The mixture of linear block copolymers obtained after the treatment with the proton-active substances is isolated from the reaction solution in a conventional manner, for example by precipitation with methanol, by stripping off the solvent in a pressure-release apparatus and extruding the required product, by spraying the solution with steam, or by stripping the solvent by means of superheated steam. Combinations of the above workingup processes may also be used.

Following the treatment with proton-active substances, but advantageously before isolating the product from the reaction solution, the mixture of block copolymers may, if desired, be hydrogenated. This hydrogenation may be carried out selectively or non-selectively and is normally effected with the aid of molecular hydrogen and catalysts based on metals or metal salts of group 8 of the periodic table. It may be effected in a homogeneous phase, using catalysts based on salts, especially carboxylates, alkoxides or enolates, of cobalt, nickel or iron, which have been reduced with metal alkyls, especially aluminum alkyls, as described, for example, in U.S. Pat. No. 3,113,986, German Published Application DAS No. 1,222,260 or German Laid-Open Application DOS No. 2,013,263. In these cases, the olefinic double bonds are selectively hydrogenated under mild conditions at hydrogen pressures of from 1 to 100 bar and at from 25° to 150° C. The hydrogenation can, alternatively, be carried out in a heterogeneous phase with nickel or platinum metal as the catalyst, under hydrogen pressures of from 20 to 300 bar and at from 40° to 300° C. (for example as described in German Published Application DAS No. 1,106,961 or German Laid-Open Application DOS No. 1,595,345). In this process, the aromatic double bonds are as a rule hydrogenated in addition to the olefinic double bonds. If hydrogenation in solution is employed, it is preferably carried out in the same solvent as the preceding polymerization. The block copolymer mixture can be hydrogenated selectively, partially or completely. If hydrogenation is employed, it is preferred selectively to hydrogenate the olefinic double bonds of the polymer, after which the hydrogenated block copolymer mixture should preferably contain only less than 10%, and especially less than 3%, of the olefinic double bonds originally present.

The non-elastomeric polymer segment $A^1$, which contains, as copolymerized units, from 40 to 80% by weight, preferably from 45 to 70% by weight, of the total amount of monovinyl-aromatic monomers employed in preparing the block copolymer mixture, preferably consists exclusively of units of one of the monovinyl-aromatic monomers and in particular is a styrene homopolymer segment. Its molecular weight depends in the main on the envisaged use of the end product and is preferably from 90,000 to 130,000. The polymer segments $A^2$ correspond to the polymer segments $A^1$ except that they have a lower molecular weight, usually from 5,000 to 30,000, especially from 8,000 to 20,000. They contain from 10 to 30% by weight, and preferably from 15 to 25% by weight, of the total monovinyl-aromatic monomer, as copolymerized units. The elastomeric polymer segment B is, as mentioned, a copolymer block consisting essentially of the conjugated diene with a small proportion of monovinyl-aromatic monomer, and may, if required, be selectively hydrogenated, especially in respect of the olefinic double bonds. The proportion of monovinyl-aromatic monomer in the polymer segment B is in general below about 30% by weight and especially below about 15% by weight, based on the amount of monovinyl-aromatic monomers not included in the polymer segments $A^1$ and $A^2$. The non-elastomeric polymer segments $A^3$ consist, like the polymer segments $A^1$ and $A^2$, preferably only of units of the monovinyl-aromatic compound and are, in particular, styrene homopolymer segments. The sum of the molecular weights of the polymer blocks ($A^1$-$A^2$-B→$A^3$) is in general from 120,000 to 300,000, preferably from 140,000 to 240,000, whilst that of the polymer blocks ($A^2$-B→$A^3$) is from 20,000 to 100,000, especially from 30,000 to 80,000. These figures relate to the weight-average molecular weight, determined by viscosity measurements in toluene at 25° C.

The mixture essentially contains the following two linear three-block copolymers

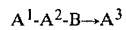

where $A^1$, $A^2$ and $A^3$ are non-elastomeric polymer segments of different molecular weight or different structure, and are based on a monovinyl-aromatic compound, and B is an elastomeric polymer segment based on a conjugated diene of 4 to 8 carbon atoms, and the transitions between the polymer segments B and $A^3$ are gradual and all other transitions are sharp.

The mixtures of linear block copolymers prepared by the process according to the invention possess high transparency and clarity and good mechanical properties, and are in particular similar, in respect of impact strength and elongation at break, to the products known from (3) and (4). It was not foreseeable that the processability of the novel mixtures of linear block copolymers would not differ significantly from that of branched block copolymers prepared by the process disclosed in (4).

The mixtures of linear block copolymers prepared according to the invention can easily be processed by conventional thermoplastic processing methods, such as extrusion, thermoforming or injection molding, and are in particular suitable for the production of moldings and packaging materials. By hydrogenation it is possible to improve, in particular, the aging resistance of the products and their mixtures with, for example, other plastics such as polystyrene. The mixtures obtained by the novel process are particularly suitable for mixing with standard polystyrene, in amounts known to a skilled worker, in order to improve the properties of the standard polystyrene.

The Examples which follow illustrate the invention. The intrinsic viscosity, measured in 0.5% strength solution in toluene at 25° C., is used as a measure of the molecular weight. The notched impact strengths of test specimens with and without a hole, $A_{KL}$ and $A_k$ respectively, were determined on injection moldings in accordance with DIN No. 53,453. The yield stress $\sigma_S$ and the elongation at break $\epsilon_R$ were measured on an injection-molded half-dumb-bell, according to DIN No. 53,455. The mechanical behavior of the products on rapid stressing was also examined, by the method of DIN No. 53,443, page 2 (Plasticon test). In the Example and Comparative Experiment, parts and percentages are by weight. The haze was measured according to DIN No. 5036 (1966 version).

EXAMPLE 584 g of styrene in 4,368 g of cyclohexane were titrated with sec.-butyl-lithium under an inert gas until the solution assumed a red coloration, and were then polymerized with 3.72 millimoles ($I_a$) of sec.-butyl-lithium as the initiator for 45 minutes at 60° C. A sample proved to have an intrinsic viscosity of 68.8 cm³/g. A further 18.98 millimoles ($I_b$) of sec.-butyl-lithium and 219 g of styrene were added and this mixture was polymerized for 45 minutes at 60° C. The intrinsic viscosity of a sample was found to be 56 cm³/g. In a subsequent stage, a mixture of 219 g of styrene and 378 g of butadiene was added and the solution was stirred for 2½ hours at 60° C. until it exhibited a distinct red color; it was then stirred for a further 45 minutes, after which the polymerization was stopped with 25 g of isopropanol. 4.3 g of tert.-butyl-cresol were added as a stabilizer and the mixture of polymers was precipitated and dried under reduced pressure. The intrinsic viscosity of the final product was found to be 78 cm³/g.

COMPARATIVE EXPERIMENT 584 g of styrene in 4,368 g of cyclohexane were titrated with sec.-butyl-lithium under an inert gas (N₂) until the solution assumed a red coloration, and were then polymerized with 3.7 millimoles of sec.-butyl-lithium ($I_a$) as the initiator for 45 minutes at 60° C. The intrinsic viscosity was found to be 62.5 cm³/g. A further 18.98 millimoles ($I_b$) of sec.-butyl-lithium and 219 g of styrene were added and this mixture was polymerized for 45 minutes at 60° C. The intrinsic viscosity of a sample was found to be 75.2 cm³/g. In a further process stage, 378 g of butadiene were added and the mixture was polymerized for 1½ hours at 60°–80° C. The intrinsic viscosity of a sample was found to be 84.6 cm³/g.

219 g of styrene were finally added and the mixture was stirred for 45 minutes at 60° C. The polymerization was then stopped by adding 35 g of isopropanol and the product was stabilized with 4.3 g of tert.-butyl-cresol, precipitated and dried under reduced pressure. The intrinsic viscosity, determined on the end product, was 89 cm³/g.

The Table which follows compares a series of measurements on the mixture according to the invention and the mixture from the Comparative Experiment. The experimental results show that the mixture according to the invention has similar rigidity (compare the values for the yield stress) and similar behavior when rapidly stressed (Plasticon test), but is superior in toughness, elongation and transparency (haze in %) to the comparative product.

The Comparative Experiment accordingly substantiates that the mixtures according to the invention, having a smudged B→A³ transition, are superior to mixtures of the same composition with sharp transitions B→A³.

This was not to be expected by a skilled worker.

|  | Example | Comparative Experiment |
|---|---|---|
| Notched impact strength [kJ/m²] | 31.7 | 6.6 |
| Notched impact strength (specimen with hole) [kJ/m²] | 48.8 | 10.5 |
| Yield stress, $\sigma_s$, [N/mm²] | 21.0 | 28.1 |
| Elongation at break, $\epsilon_R$, [%] | 137.2 | 24.7 |
| Damaging energy. [Nm] | 20.22 | 20.99 |
| Perforation energy [Nm] | 30.75 | 31.77 |
| Damaging force [N] | 2281.44 | 2336.32 |
| Deformation to damage (mm) | 13.74 | 13.29 |
| Haze [%] | 6 | 10 |

We claim:
1. A composition from a process for the preparation of a mixture of block copolymers which essentially contain from 70 to 80% by weight of a monovinyl-aromatic monomer and from 20 to 30% by weight of a conjugated diene, the mixture essentially containing the two linear three-block copolymers A¹-A²-B→A³ and A²-B→A³ where A¹, A² and A³ are non-elastomeric polymer segments of different molecular weight or different structure, and are based on a monovinyl-aromatic compound, and B is an elastomeric polymer segment based on a conjugated diene of 4 to 8 carbon atoms, and the transitions between the polymer segments B and A³ are gradual and the other transitions are all sharp, by effecting the following process stages in an inert solvent:
 (a) in a first process stage, polymerizing 40 to 80% by weight of the total monovinyl-aromatic monomer(s) in the presence of an initial amount of a monolithium-hydrocarbon as the initiator, (Ia), until the monomer(s) has been substantially completely converted to A¹-Li, thereafter
 (b) in a second process stage, adding the remaining amount of initiator, (Ib), the molar ratio of Ia:Ib being from 1:2 to 1:7, adding further a proportion of 15 to 30% by weight of the total monovinyl-aromatic monomer(s) to the solution, and continuing the polymerization until the monomer(s) has been substantially completely converted to a mixture of A¹-A²-Li and A²-Li, and finally
 (c) in a third process stage, adding to the reaction solution a mixture of from 10 to 30% by weight of the total amount of monovinyl-aromatic monomer(s) to be employed, and from 20 to 30% by weight of conjugated diene monomer, based on the total amount of all monomers to be employed, and after complete conversion of the monomers the mixture of the lithium-terminated block copolymers A¹-A²-B→A³-Li and A²-B→A³-Li is treated with protonactive compounds and the resulting mixture of block copolymers A¹-A²-B→A³ and A²-B-A³ is isolated by removing the solvent.

2. The composition of claim 1, wherein the resulting mixture of block copolymers is treated with hydrogen in the presence of a conventional hydrogenation catalyst, before or after removal of the solvent.

3. The composition of claim 2, wherein this treatment is continued until at least the copolymerized diene units of the block copolymers have been hydrogenated to a residual content of <10%.

4. Moldings produced from compositions of claim 1 or 2 or 3.

* * * * *